United States Patent [19]

Sanders

[11] Patent Number: 4,813,758

[45] Date of Patent: Mar. 21, 1989

[54] VEHICLE PARKING GUIDE

[76] Inventor: William E. Sanders, 238 Trianon La., Villanova, Pa. 19085

[21] Appl. No.: 42,844

[22] Filed: Apr. 27, 1987

[51] Int. Cl.$^4$ .................... G02B 5/12; B60Q 11/00
[52] U.S. Cl. .................................. 350/97; 116/28 R; 33/264
[58] Field of Search .................. 350/97, 99, 631–634; 340/51; 116/28 R, 35 R; 33/264

[56] References Cited

U.S. PATENT DOCUMENTS

| | | | |
|---|---|---|---|
| 1,981,188 | 11/1934 | Pavitt | 116/28 R |
| 2,693,044 | 11/1954 | Roemisch | 40/39 |
| 2,834,315 | 5/1958 | Simpson | 116/67 |
| 2,854,942 | 10/1958 | Ross | 116/28 R |
| 3,219,972 | 11/1965 | Williams | 340/61 |
| 3,621,807 | 11/1971 | Kang | 116/28 R |
| 3,793,981 | 2/1974 | Sparks | 116/28 R |
| 3,817,203 | 6/1974 | Brauer | 116/28 R |
| 3,844,050 | 10/1974 | Lynn | 33/264 |
| 3,858,966 | 1/1975 | Lowell, Jr. | 350/307 |
| 4,036,165 | 7/1977 | Wood | 116/28 R |
| 4,101,868 | 7/1978 | Bubnich et al. | 340/51 |

OTHER PUBLICATIONS

Auto Ideas, vol. 126, Jan., 1935, p. 76.

Primary Examiner—John K. Corbin
Assistant Examiner—Loha Ben
Attorney, Agent, or Firm—Wood, Dalton, Phillips, Mason & Rowe

[57] ABSTRACT

A vehicle parking guide for use on a supporting surface disposed in a preselected travel path. The vehicle parking guide includes a plate adapted to be fixedly mounted on the supporting surface. It also includes lateral vehicle positioning members for ensuring proper lateral vehicle positioning to coincide with the preselected travel path as the vehicle approaches the supporting surface. It further includes a longitudinal vehicle positioning member for ensuring proper longitudinal vehicle positioning to coincide with a preselected stopping point as the vehicle is stopped near the supporting surface. The vehicle parking guide is also provided with at least one fastener capable of fixedly mounting the plate on the supporting surface. With these features, the vehicle parking guide is adapted for properly positioning a vehicle in a preselected position as it is parked.

16 Claims, 1 Drawing Sheet

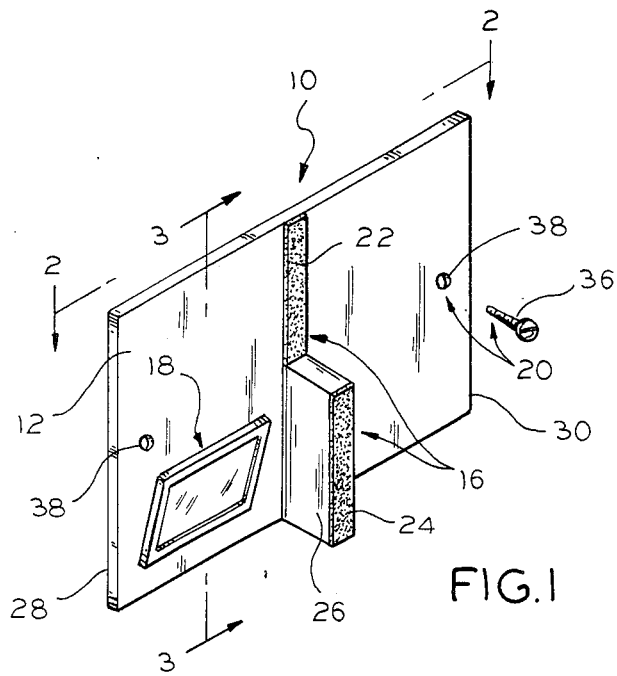# 
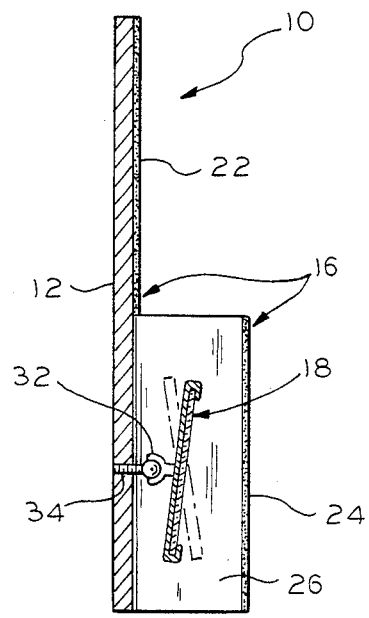
FIG. 1
FIG. 3
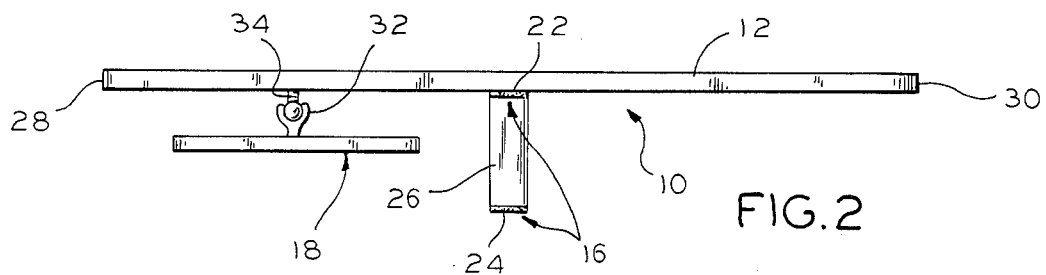
FIG. 2
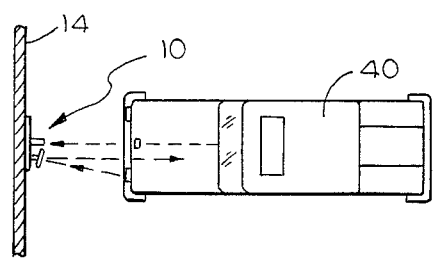
FIG. 4
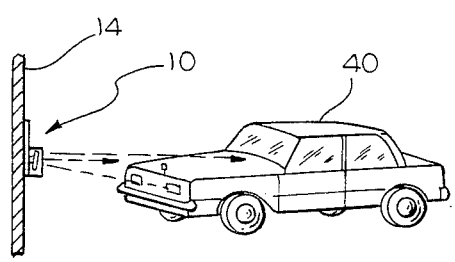
FIG. 5

VEHICLE PARKING GUIDE

FIELD OF THE INVENTION

The present invention is generally related to vehicle parking guides and, more particularly, to a vehicle parking guide for use in a preselected travel path.

BACKGROUND OF THE INVENTION

For nearly every licensed driver, it is known that positioning a vehicle in a garage requires considerable accuracy to avoid any damage to the garage or the vehicle. For instance, the bumpers, fenders or grill may easily be damaged by contact with the stationary rear wall of a garage or obstacles at or near the rear wall, particularly those which constitute projections or barriers which are ordinarily obscured from the driver's line of sight. Moreover, where the garage is undersized in relation to the vehicle, it is oftentimes essential to closely position the front bumper so as to nearly contact the rear wall of the garage.

Of course, the latter problem is directly related to the complete enjoyment of garage door openers. In the event the garage is sized such that a particular vehicle will just sit therewithin, it is important to ensure that the vehicle is properly positioned very near the rear wall of the garage while at the same time avoiding contact therewith which might otherwise damage the wall and/or the vehicle. Without so doing, the driver of the vehicle is unable to determine when the rear of the vehicle will be in the path of movement of the garage door.

Still further, it is generally recognized that residential two car garages are space limited. Thus, precision parking is essential, although not an attribute possessed by many drivers. As a result, it is difficult to ensure leaving ample aisle space to the front, rear and sides of a parked vehicle to allow ingress, egress, and access to garage contents.

In the past, a number of different vehicle parking guides have been proposed, such as, for instance, Wood U.S. Pat. No. 4,036,165, issued July 19, 1977, which proposes utilizing a vertically depending lever that simultaneously actuates an audible and a visible signal to apprise the driver of his progress when contacted by the bumper of the approaching vehicle. Similarly, Williams U.S. Pat. No. 3,219,972, issued Nov. 23, 1965 proposes a parking position indicator which signals a driver of an automobile to indicate the movement of the automobile in the direction of a stationary object. In addition, Bubnich et al U.S. Pat. No. 4,101,868, issued July 18, 1978 proposes a pivotally mounted actuating lever having indicia which can be seen through a transparent sheet material only when placed in contact with the sheet material when the actuating lever is moved toward and into contact with the transparent sheet material. Still other earlier guides, components and the like are disclosed in Lowell, Jr. U.S. Pat. No. 3,858,966, Mandl U.S. Pat. No. No. 3,261,321, Ross U.S. Pat. No. 2,854,942, Roemisch U.S. Pat. No. 2,693,044, Simpson U.S. Pat. No. 2,834,315, and Pavitt U.S. Pat. No. 1,981,188.

Despite these earlier attempts to provide a parking guide, there has been no truly effective vehicle parking guide capable of both lateral and longitudinal vehicle positioning relative to a fixed point. However, the present invention is directed to overcoming the above stated problems and accomplishing the stated objects by providing a totally unique and improved vehicle parking guide.

SUMMARY OF THE INVENTION

Accordingly, the present invention is directed to a vehicle parking guide for use on a supporting surface disposed in a preselected travel path. The vehicle parking guide includes a plate adapted to be fixedly mounted on the supporting surface. It also includes means associated with the plate for ensuring proper lateral vehicle positioning to coincide with the preselected travel path as a vehicle approaches the supporting surface. It further includes means associated with the plate for ensuring proper longitudinal vehicle positioning to coincide with a preselected stopping point as the vehicle is stopped near the supporting surface. The vehicle parking guide still further includes means for fixedly mounting the plate on the supporting surface. With these features, the vehicle parking guide is well suited for properly positioning a vehicle relative to a fixed point.

In the exemplary embodiment, the lateral vehicle positioning means includes a pair of vertically disposed reflectors positioned in longitudinally offset relation. For this purpose, the plate includes a projection extending transversely of the supporting surface with one of the reflectors disposed on the plate and the other of the reflectors disposed on the transversely extending projection. Preferably, the transversely extending projection is intermediate opposing sides of the plate, and the plate is fixedly mounted in the plane defined by the supporting surface.

In addition, the reflectors are advantageously vertically disposed in the plane defined by the transversely extending projection. The projection will also, of course, not only extend transversely of the supporting surface but also of the plate. Furthermore, the reflectors each are of a length preferably comprising approximately half the height of the plate.

In the exemplary embodiment, the longitudinal vehicle positioning means includes a mirror pivotably mounted on the plate in spaced relation to the surface thereof. The mirror is pivotably mounted on the plate in spaced relation to the lateral vehicle positioning means, or reflectors, on the side of the plate corresponding to the driver's side of the vehicle, i.e., on the left for parking vehicles driven from the left front seat and on the right for parking vehicles driven from the right front seat. Advantageously, the mirror is pivotably mounted below the horizontal midpoint of the plate, is universally pivotable by means of a ball-and-socket joint or a hinged joint on a rotatable shaft, and is secured to the plate by means of a suitable fastener.

With these features, the mirror is pivotably adjustable for driver viewing of a vehicle feature upon proper longitudinal vehicle positioning. It is advantageous in this connection for the transversely extending projection to be generally rectangular in shape and disposed below the horizontal midpoint of the plate. The mirror can be rectangular but preferably is round in shape when a hinged joint on a rotatable shaft is utilized. It is also advantageous for the mirror to be disposed between the generally rectangular transversely extending projection and one of the opposing sides of the plate. When so constructed, the vehicle feature is visible in the mirror only at the preselected stopping point near the supporting surface.

Still other objects, advantages and features of the present invention will become apparent from the following specification taken in conjunction with the accompanying drawings.

BRIEF DESCRIPTION OF THE DRAWINGS

FIG. 1 is a perspective view of a vehicle parking guide in accordance with the present invention;

FIG. 2 is a top plan view taken on the line 2—2 of FIG. 1;

FIG. 3 is a cross sectional view taken on the line 3—3 of FIG. 1;

FIG. 4 is a top plan view illustrating utilization of the vehicle parking guide of FIG. 1; and FIG. 5 is a side elevational view illustrating utilization of the vehicle parking guide of FIG. 1.

DETAILED DESCRIPTION OF THE PREFERRED EMBODIMENT

An exemplary embodiment of a vehicle parking guide for use on a supporting surface disposed in a preselected travel path is illustrated in FIG. 1. The vehicle parking guide 10 includes a plate 12 adapted to be fixedly mounted on the supporting surface 14 (see FIGS. 4 and 5). It also includes means (generally designated 16) associated with the plate 12 for ensuring proper lateral vehicle positioning to coincide with the preselected travel path as a vehicle approaches the supporting surface 14. It further includes means (generally designated 18) associated with the plate 12 for ensuring proper longitudinal vehicle positioning to coincide with a preselected stopping point as the vehicle is stopped near the supporting surface 14. The vehicle parking guide 10 still further includes means 20 for fixedly mounting the plate 12 on the supporting surface 14. With these features, the vehicle parking guide 10 is well suited for both lateral and longitudinal vehicle positioning, as will become apparent from the description hereinbelow.

Referring now to FIGS. 1 through 3, the lateral vehicle positioning means 16 includes a pair of vertically disposed reflectors 22 and 24 positioned in longitudinal offset relation. The plate 12 includes a projection 26 extending transversely of the supporting surface 14 (see FIGS. 4 and 5) with one of the reflectors 22 being disposed on the plate 12 and the other of the reflectors 24 being disposed on the transversely extending projection 26. As shown, the transversely extending projection 26 is integrally formed intermediate opposing sides 28 and 30 of the plate 12, and the plate 12 is fixedly mounted in the plane defined by the supporting surface 14 (see FIGS. 4 and 5).

As will be clear from FIGS. 1 through 3, the reflectors 22 and 24 are vertically disposed in the plane defined by the transversely extending projection 26. It will also be appreciated, especially from FIG. 2, that the projection 26 extends not only transversely of the supporting surface 14 but also extends transversely of the plate 12. Moreover, the reflectors 22 and 24 are each preferably of a length comprising approximately half the height of the plate 12.

Still referring to FIGS. 1 through 3, the longitudinal vehicle positioning means 18 includes a mirror pivotably mounted on the plate 12 in spaced relation to the surface thereof. The mirror 18 is also pivotably mounted on the plate 12 by means of either a ball-and-socket joint or a hinged joint on a rotatable shaft and is in spaced relation to the reflectors 22 and 24 and the transversely extending projection 26 on the side of the plate 12 corresponding to the driver's side of the vehicle, i.e., on the left side of the plate 12 as normally viewed by the driver of a vehicle driven from the left front seat and vice versa (see FIGS. 4 and 5). As shown, the mirror 18 is pivotably mounted below the horizontal midpoint of the plate 12, is universally pivotable by means of a ball-and-socket joint 32, and is secured to the plate 12 by means of a fastener 34.

As will be appreciated, the mirror 18 is pivotably adjustable for driver viewing of a vehicle feature upon proper longitudinal vehicle positioning. More specifically, the transversely extending projection 26 is generally rectangular in shape and disposed below the horizontal midpoint of the plate 12. The mirror 18 can be rectangular (as shown) but is preferably round in shape when a hinged joint on a rotatable shaft is utilized. The mirror 18 is disposed on the left (or right) side thereof between the generally rectangular transversely extending projection 26 and the side 28 of the plate 12. As so formed, the vehicle feature is visible in the mirror 18 only at the preselected stopping point near the supporting surface 14.

In the preferred embodiment, the plate is generally rectangular in shape, although other shapes are also permissible. It will also be seen that the mounting means 20 includes at least one and preferably a pair of fasteners (such as the screw 36 illustrated in FIG. 1) which are adapted to extend through one or a pair of holes 38 in the plate 12, although the mounting means 20 can also suitably comprise other fasteners such as double faced pressure sensitive adhesive tape or the like. Moreover, the mirror 18 is illustrated as generally rectangular in shape, although other shapes are permissible.

The generally rectangular transversely extending projection 26 has been disclosed as positioned below the horizontal midpoint of the plate 12. However, it can also be positioned above the horizontal midpoint of the plate 12. Then, the other reflector 22 will reverse position with the generally rectangular transversely extending projection 26. Specifically, it will be disposed below the horizontal midpoint of the plate 12. In either case, the important factor is the horizontal offset by means of which the reflectors 22 and 24 are at different depths when viewed by the driver of a vehicle.

With the vehicle parking guide 10 as illustrated, it is installed on a supporting surface 14 such as the rear wall of a garage after a vehicle has been placed in the optimum position therein. This is done by having the usual driver of the vehicle sit in the driver's seat in the normal driving position preferably while another person locates the proper mounting position by holding the vehicle parking guide 10 so that the mirror 18 and reflector 24 are disposed above the vehicle hood so as to be visible with the reflectors 22 and 24 in vertical alignment after which the vehicle parking guide 10 is attached to the wall by means of the screws 36. At this point, the mirror 18 is also adjusted by the other person, or by the driver using the trial and error method, until the driver can clearly see a vehicle feature that is readily identifiable such as the left (or right) headlight.

Once so installed, the driver can be assured of proper lateral positioning of the vehicle 40. When pulling into the garage, the driver can visually determine when the reflectors 22 and 24 are in vertical alignment after which the driver can continue pulling the vehicle 40 into the garage while maintaining the reflectors 22 and 24 in vertical alignment until such time as the left (or right) headlight (or other selected readily identifiable vehicle feature) is visible in the mirror 18 (see FIGS. 4 and 5). When this occurs, the vehicle 40 is stopped where it once again is in the optimum position in the garage.

With the device illustrated in FIG. 1, the lower reflector 24 will appear to the right of the upper reflector 22 when the driver is too far to the left. Conversely, the lower reflector 24 will be to the left of the upper reflector 22 when the driver is too far to the right. In order to be in the preselected travel path, the driver must have the reflectors 22 and 24 in exact vertical alignment.

Essentially, the vehicle parking guide 10 is a failsafe system for proper lateral vehicle positioning. It is simply impossible to deviate to any significant degree so long as the driver aligns the reflectors 22 and 24 vertically which can only be done when the vehicle 40 is following the preselected travel path. Likewise, the vehicle 40 will be placed in proper longitudinal position upon viewing the left (or right) headlight in the mirror 18.

Preferably, the vehicle parking guide 10 is integrally formed of plastic to have a black matte finish with the mirror 18 being joined to the ball-and-socket joint 32 directly behind the center thereof. Preferably, the reflectors 22 and 24 are of different colors, which will simplify instructions to the consumer. Moreover, the vehicle parking guide is preferably on the order of 6½ inches wide by 5½ inches high, and the lower reflector 24 projects a minimum of 3½ inches outwardly of the upper reflector 22.

While in the foregoing there has been set forth a preferred embodiment of the invention, it is to be understood that the invention is only to be limited by the spirit and scope of the appended claims.

I claim:

1. A vehicle parking guide for use on a supporting surface disposed in a preselected travel path, comprising:
   a plate adapted to be fixedly mounted relative to said supporting surface;
   means associated with said plate for ensuring proper lateral vehicle positioning to coincide with said preselected travel path as a vehicle approaches said plate; and
   means associated with said plate for ensuring proper longitudinal vehicle positioning to coincide with a preselected stopping point as said vehicle is stopped near said plate;
   said lateral vehicle positioning means including a pair of vertically disposed reflectors positioned in longitudinally offset relation;
   said plate including a projection extending transversely of said supporting surface, one of said reflectors being disposed on said plate, the other of said reflectors being disposed on said transversely extending projection.

2. The vehicle parking guide as defined by claim 1 wherein said plate is generally rectangular in shape, and further including means for fixedly mounting said plate on said supporting surface, said mounting means for said plate including at least one fastener.

3. The vehicle parking guide as defined by claim 1 wherein said transversely extending projection is intermediate opposing sides of said plate, said plate being integral with said transversely extending projection, said plate being fixedly mounted in the plane defined by said supporting surface.

4. The vehicle parking guide as defined by claim 3 wherein said reflectors are vertically disposed in the plane defined by said transversely extending projection, said projection also extending transversely of said plate, said reflectors each being of a length comprising approximately half the height of said plate.

5. The vehicle parking guide as defined by claim 1 wherein said longitudinal vehicle positioning means include a mirror, said mirror being pivotably mounted relative to said plate in spaced relation to the surface thereof.

6. The vehicle parking guide as defined by claim 5 wherein said mirror is pivotably mounted relative to said plate in spaced relation to said lateral vehicle positioning means, said mirror being pivotably mounted on the side of said plate corresponding to the driver's side of said vehicle.

7. A vehicle parking guide for use on a supporting surface disposed in a preselected travel path, comprising:
   a plate adapted to be fixedly mounted on said supporting surface;
   means associated with said plate for ensuring proper lateral vehicle positioning to coincide with a preselected travel path as a vehicle approaches said supporting surface, said lateral vehicle positioning means including a pair of vertically disposed reflectors, said vertically disposed reflectors being positioned in longitudinally offset relation;
   means associated with said plate for ensuring proper longitudinal vehicle positioning to coincide with a preselected stopping point as said vehicle is stopped near said supporting surface, said longitudinal vehicle positioning means including a mirror, said mirror being pivotably mounted on said plate in spaced relation to the surface thereof; and
   means for fixedly mounting said plate on said supporting surface.

8. The vehicle parking guide as defined by claim 7 wherein said plate includes a projection extending transversely of said supporting surface, one of said reflectors being disposed on said plate, the other of said reflectors being disposed on said transversely extending projection.

9. The vehicle parking guide as defined by claim 8 wherein said transversely extending projection is intermediate opposing sides of said plate, said plate being integral with said transversely extending projection, said plate being fixedly mounted in the plane defined by said supporting surface.

10. The vehicle parking guide as defined by claim 9 wherein said reflectors are vertically disposed in the plane defined by said transversely extending projection, said projection also extending transversely of said plate, said reflectors each being of a length comprising approximately half the height of said plate.

11. The vehicle parking guide as defined by claim 10 wherein said mirror is pivotably mounted on said plate in spaced relation to said reflectors, said mirror being pivotably mounted on the side of said plate corresponding to the driver's side of said vehicle.

12. The vehicle parking guide as defined by claim 11 wherein said mirror is pivotably mounted below the horizontal midpoint of said plate, said mirror being universally pivotable and including a ball-and-socket joint, said mirror being secured to said plate by a fastener.

13. The vehicle parking guide as defined by claim 7 wherein said mirror is pivotably adjustable for driver viewing of a vehicle feature upon proper longitudinal vehicle positioning, said vehicle feature being visible in said mirror only at said preselected stopping point near said supporting surface.

14. A vehicle parking guide for use on a supporting surface disposed in a preselected travel path, comprising:

a plate adapted to be fixedly mounted on said supporting surface, said plate being generally rectangular in shape;

means associated with said plate for ensuring proper lateral vehicle positioning to coincide with said preselected travel path as a vehicle approaches said supporting surface, said lateral vehicle positioning means including a pair of vertically disposed reflectors, said vertically disposed reflectors being positioned in longitudinally offset relation;

said plate including a projection extending transversely of said supporting surface, one of said reflectors being disposed on said plate, the other of said reflectors being disposed on said transversely extending projection, said transversely extending projection being intermediate opposing sides of said plate, said plate being integral with said transversely extending projection, said plate being fixedly mounted in the plane defined by said supporting surface, said reflectors being vertically disposed in the plane defined by said transversely extending projection, said projection also extending transversely of said plate, said reflectors each being of a length comprising approximately half the height of said plate;

means associated with said plate for ensuring proper longitudinal vehicle positioning to coincide with a preselected stopping point as said vehicle is stopped near said supporting surface, said longitudinal vehicle positioning means including a mirror, said mirror being pivotably mounted on said plate in spaced relation to the surface thereof;

said mirror being pivotably mounted on said plate in spaced relation to said reflectors, said mirror being pivotably mounted on the side of said plate corresponding to the driver's side of said vehicle, said mirror being universally pivotable and including a ball-and-socket joint, said mirror being secured to said plate by a fastener, said mirror being pivotably adjustable for driver viewing of a vehicle feature upon proper longitudinal vehicle positioning, said vehicle feature being visible in said mirror only at said preselected stopping point near said supporting surface; and means for fixedly mounting said plate on said supporting surface.

15. The vehicle parking guide as defined by claim 14 wherein said reflectors are each of a different color.

16. The vehicle parking guide as defined by claim 14 wherein said transversely extending projection is disposed below the horizontal midpoint of said plate and said mirror is disposed between said transversely extending projection and one of said opposing sides of said plate.

* * * * *